May 10, 1927.

V. DE MEO

LINE CLAMP

Filed Jan. 6, 1927

INVENTOR
Vladimiro De Meo
BY
H. G. Manning
ATTORNEY

Patented May 10, 1927.

1,628,235

UNITED STATES PATENT OFFICE.

VLADIMIRO DE MEO, OF WATERBURY, CONNECTICUT.

LINE CLAMP.

Application filed January 6, 1927. Serial No. 159,388.

This invention relates to improvements in line clamps, and more particularly to a fastener for adjustably connecting the ends of two lines or of a single line, such as a clothes line.

One object of this invention is to provide a fastener adapted to frictionally grip one end of the line in such a way that the greater the tension in the line the stronger will be the clamping effect of the fastener.

A further object is to provide a line clamp of the above nature which may be quickly and easily attached to and detached from the line and which may also be readily shifted along the line to any desired position.

A still further object is to provide a line clamp of the above nature having a pair of automatically operated self-tightening jaws provided with means for preventing said jaws from getting out of alinement relative to each other.

A further object is to provide a device of the above nature which will be simple in construction, inexpensive to manufacture, easy to manipulate, compact, and very efficient and durable in use.

With these and other objects in view there has been illustrated on the accompanying drawings one form in which the invention may be conveniently embodied in practice.

Figure 1:
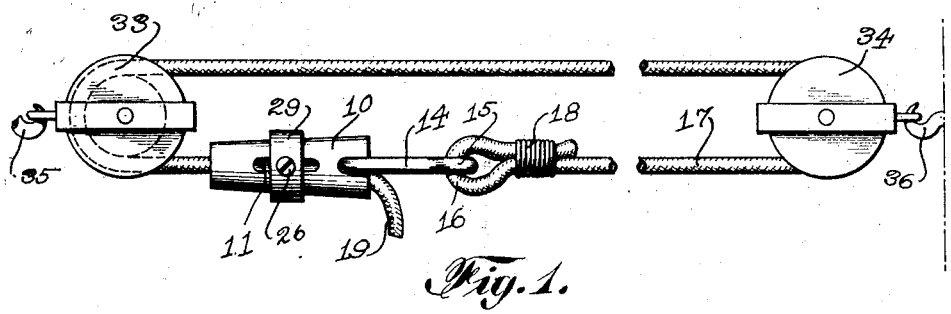
Fig. 1 represents a side view of one of the improved line fasteners as it appears when connected to the ends of a clothes line.

In the use of previous forms of line clamps employing self-tightening jaws for gripping the free end of the line, it was found that the jaws were quite liable to slide relative to one another and get out of alinement, thus reducing the effective gripping area of the jaw faces and allowing the line to slip.

By means of the present invention the above and other disadvantages have been avoided. This has been accomplished by providing means connected with said jaws for holding them in absolute alinement, while at the same time permitting them to spread apart.

Referring now to the drawings in which like reference numerals denote corresponding parts throughout the several views, the numeral 10 indicates a tubular body member formed in the shape of a hollow truncated cone, said member being provided intermediate its ends with a pair of elongated slots 11, said slots being positioned in opposite sides of said body member and in alinement with each other.

Adjacent the larger end of the body member, provision is made of a pair of opposed apertures 12 which are adapted to form pivot bearings for the inturned ends 13 of the yoke member 14, said yoke member having its other end 15 reduced in width for receiving one end 16 of a line 17. The end 16 may be permanently secured in any suitable manner to the line 17, as by a winding 18 of smaller cord or wire.

In order to permit the free end 19 of the line to be moved relative to the line clamp, provision is made of a pair of complementary semi-conical wedge jaws 20 and 21, said wedge jaws having their outer faces adapted to seat within the tubular body member 10 and having serrated inner surfaces 22 for affording a strong frictional grip upon the free end 19 of the line.

Figure 2:
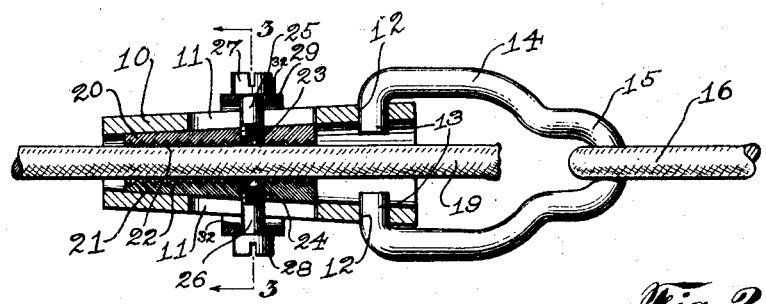
Fig. 2 is a sectional view of the line clamp, shown on an enlarged scale.
Figure 3:
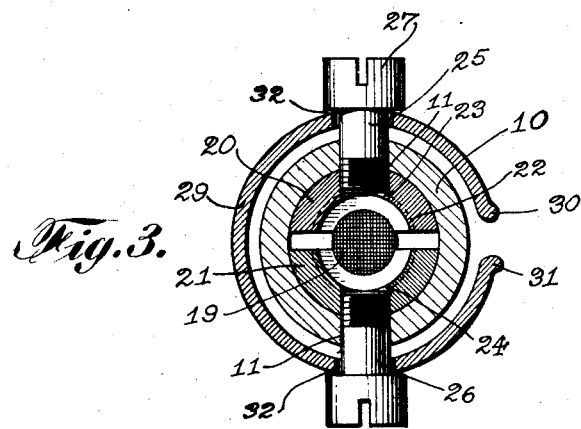
Fig. 3 is a transverse sectional view of the line clamp, taken along the line 3—3 of Fig. 2 looking in the direction of the arrows.

In order to hold the wedge jaws 20 and 21 in absolute longitudinal alinement, and yet permit them to separate transversely with respect to the body member, said jaws are provided with threaded apertures 23 and 24 adjacent their larger ends for receiving a pair of threaded bolts 25 and 26, said bolts having slotted heads 27 and 28, by means of which they may be adjusted with respect to the jaw members 20 and 21. The intermediate shanks of the bolts 25 and 26, as clearly shown in Figs. 2 and 3, are adapted to slide freely within the slots 11, previously described, of the body member 10, and said bolts are adapted to be held in absolute alinement at all times by means of a resilient clip member 29 having spaced ends 30 and 31 arranged adjacent each other. The clip member 29 has apertures 32 within which the shanks of the bolts 27 and 28 are loosely fitted.

In the present instance, the clothes line 17 is shown as passing around a pair of pulleys 33 and 34, the latter being attached to suitable hooks 35 and 36. It will be understood, however, that the invention is not limited to such a use but may be also employed in any case where it is desired to detachably connect the ends of any form of ropes, cables, pipes, or wires.

In operation, when it is desired to connect the free end 19 of the line to the line clamp, the operator will first grasp the clip 29 and force it to the right as far as it will go, as viewed in Figs. 1 and 2. As will be evident, this operation will spread the wedge jaws 20 and 21 apart transversely. The operator will then insert the free end of the line 19 between said jaws pulling it from left to right until it has reached the desired position. The clip 29 will then be pushed to the left until the serrated faces of the wedge jaws come into contact with the free end 19 of the line, whereupon the operator will pull tightly upon the portions of the line at the right and left of the line clamp. This will bring the self-tightening function of the wedge jaws into action, and it will be understood that the greater the tension in the line the stronger will be the clamping action of said jaws.

While there has been disclosed in this specification one form in which the invention may be embodied, it is to be understood that this form is shown for the purpose of illustration only, and that the invention is not to be limited to the specific disclosure but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a line clamp, a hollow conical body member, a pair of semi-conical wedge members fitting within said body member, means connected with said body member for permanently securing one end of a line, the other end of said line being adapted to be frictionally gripped by said wedge members, and means enclosing said body member for holding said wedge members in alinement.

2. In a line clamp, a hollow conical body member, a pair of semi-conical wedge members fitting within said body member, means connected with said body member for permanently securing one end of a line, the other end of said line being adapted to be frictionally gripped by said wedge members, said wedge members having serrated inner surfaces to afford a strong grip upon said line, and means enclosing said body member for holding said wedge members in alinement.

3. In a line clamp, a hollow conical body member, a pair of semi-conical wedge members fitting within said body member, means connected with said body member for permanently securing one end of a line, the other end of said line being adapted to be frictionally gripped by said wedge members, and means passing through opposite sides of said body member for holding said wedge members in alinement.

4. In a line clamp, a hollow conical body member, a pair of semi-conical wedge members fitting within said body member, means connected with said body member for permanently securing one end of a line, the other end of said line being adapted to be frictionally gripped by said wedge members, said wedge members having outwardly extending projections passing through said body member, and means outside said body member for holding said projections in alinement.

5. In a line clamp, a hollow conical body member, a pair of semi-conical wedge members fitting within said body member, means connected with said body member for permanently securing one end of a line, the other end of said line being adapted to be frictionally gripped by said wedge members, said wedge members having outwardly extending projections passing through said body member, and a spring clip outside said body member for engaging said projections and holding said wedge members in alinement.

6. In a line clamp, a tubular body member, a pair of opposed tapered wedge members carried therein for frictionally clamping the free end of a line, means for connecting said body member permanently to the other end of said line, a pair of bolts threaded into said wedge members and having their outer ends projecting through said tubular body member, and means connected with said bolts for holding them in alinement.

7. In a line clamp, a tubular body member, a pair of opposed tapered wedge members carried therein for frictionally clamping the free end of a line, means for connecting said body member permanently to the other end of said line, a pair of bolts threaded into said wedge members and having their outer ends projecting through said tubular body member, and a resilient ring spaced from said body member and connected with said bolts for holding said wedge members in alinement.

8. In a line clamp, a tubular tapered body member, a pair of opposed semi-tubular wedge members fitting within said body member for frictionally clamping one end of a line, means on said body member permanently connected with the other end of said line, and means passing through opposite sides of said body member for holding said wedge members in alinement.

9. In a line clamp, a tubular body member, a pair of opposed semi-tubular wedge members fitting within said body member for frictionally clamping one end of a line, means on said body member permanently connected with the other end of said line, means slidable in said body member for holding said wedge members in alinement, and means for connecting said slidable means together.

10. In a line clamp, a tubular tapered body member, a pair of opposed semi-tubular wedge members fitting within said body member for frictionally clamping one end of a line, a pair of adjustable lugs extending from said wedge members, means on said body member permanently connected with the other end of said line, and means for holding said lugs in alinement.

11. In a line clamp, a tubular body member, a pair of opposed tapered wedge members carried therein for frictionally clamping the free end of a line, means for connecting said body member permanently to the other end of said line, means on said wedge members projecting through said tubular body member, and means connected with said bolts for holding them in alinement.

In testimony whereof, I have affixed my signature to this specification.

VLADIMIRO DE MEO.